Nov. 17, 1959    J. G. MOHR    2,913,240
GLASS FIBER REINFORCED SPRING
Filed May 23, 1957    3 Sheets-Sheet 1
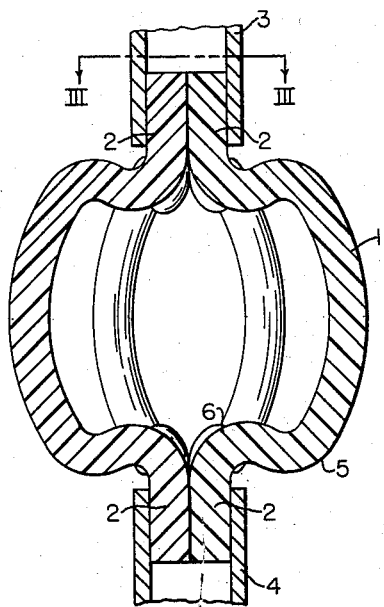
Fig. I
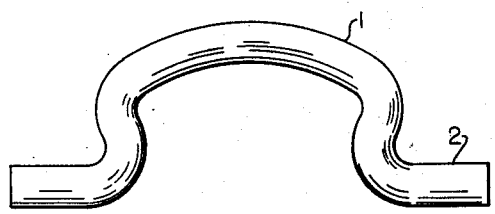
Fig. II
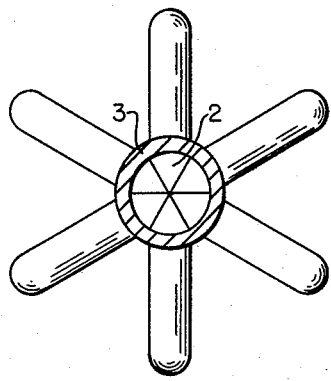
Fig. III
INVENTOR.
JOHN G. MOHR
BY
ATTORNEYS Nov. 17, 1959 J. G. MOHR 2,913,240
GLASS FIBER REINFORCED SPRING
Filed May 23, 1957 3 Sheets-Sheet 2
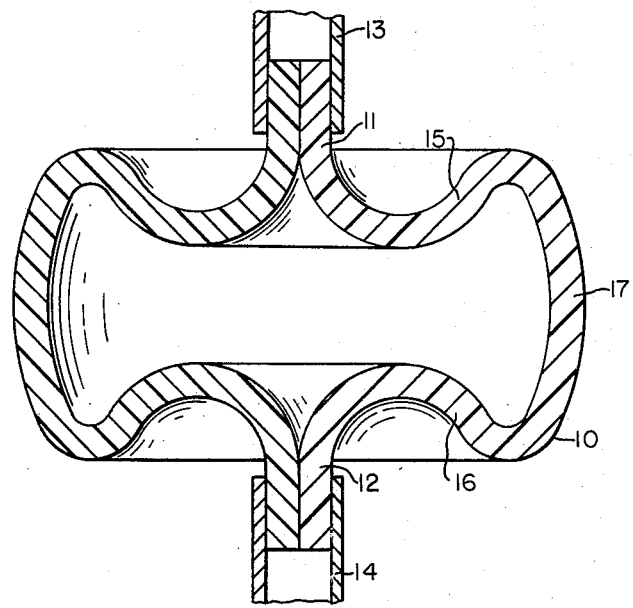
_Fig. IV_
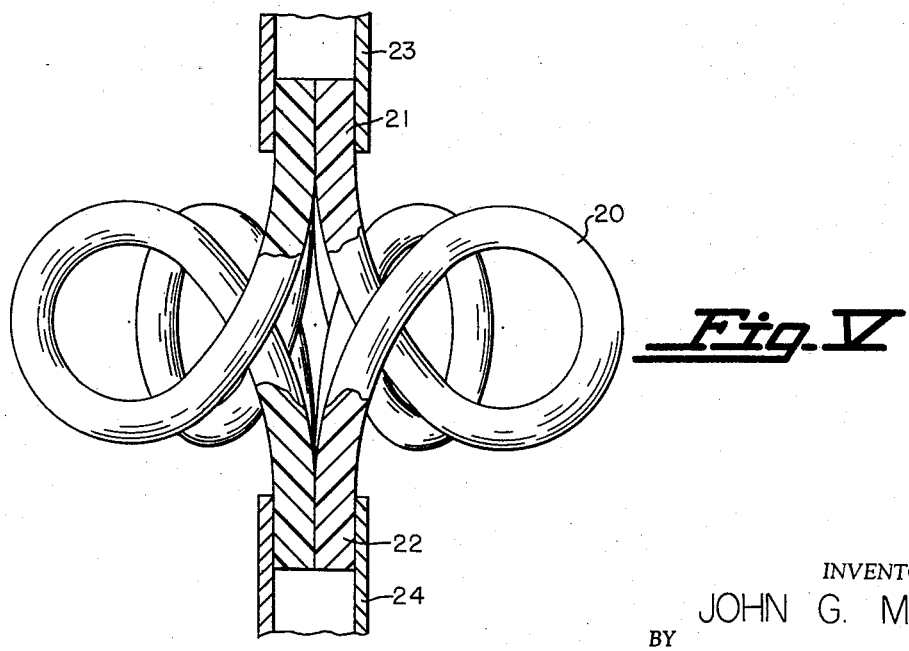
_Fig. V_
INVENTOR.
JOHN G. MOHR
BY
Marshall, Marshall & Yeasting
ATTORNEYS Nov. 17, 1959    J. G. MOHR    2,913,240
GLASS FIBER REINFORCED SPRING
Filed May 23, 1957    3 Sheets-Sheet 3
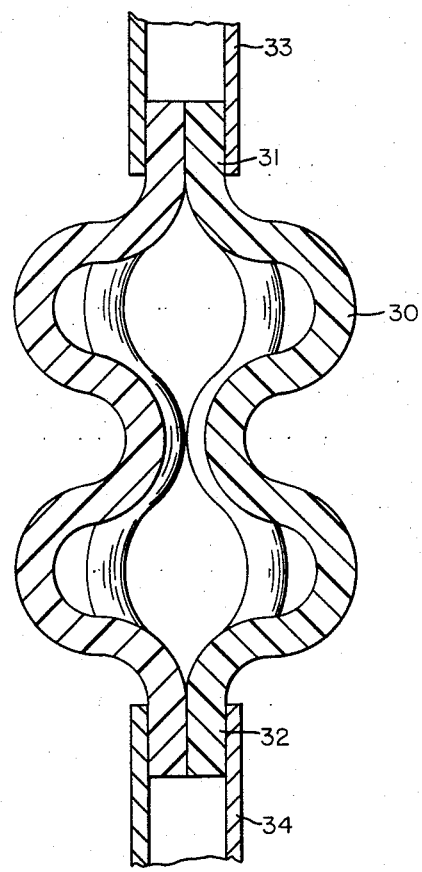
Fig. VI
INVENTOR.
JOHN G. MOHR
BY
Marshall, Marshall & Gasting
ATTORNEYS United States Patent Office 2,913,240
Patented Nov. 17, 1959

2,913,240
GLASS FIBER REINFORCED SPRING
John G. Mohr, Woodville, Ohio
Application May 23, 1957, Serial No. 661,183
4 Claims. (Cl. 267—1)

This invention relates to glass fiber reinforced plastic rods shaped for use as springs.

Glass fiber reinforced plastic rods and rod-like articles have been used in applications requiring high resiliency and high elasticity as well as immunity from water and other liquids. One outstanding popular example is the use of glass fiber reinforced plastic for fishing rods, such as casting and fly rods. Glass fiber reinforced plastic shapes are also widely used in archery bows. Both of these uses require a material having great strength and resilience. Glass fiber reinforced plastic shapes have the desirable characteristics of high elasticity and high strengh but they suffer from the disadvantage that these characteristics apply only to stresses acting in certain directions. Thus, a rod blank for a glass fiber fishing rod may be bent to a circle, that is, its ends brought together without failure of the material. The same rod, however, is relatively weak in torsion because the glass fiber is not stressed when the rod is twisted. In fact, any of the glass fiber reinforced plastic articles exhibit high strength only in the direction of the glass fiber reinforcement. Forces at right angles to the length of the glass fiber reinforcement stress the resin only which has relatively low strength in comparison with the glass fiber. In the ordinary construction of glass fiber reinforced rods the glass fiber is in the form of long filament yarn that lays the lengthway of the rod with no cross fibers. Thus, the rod exhibits great strength in bending or in tension or compression but relatively little strength in torsion.

The principal object of this invention is to provide an improved shape for a glass fiber reinforced plastic rod for a spring assembly so that the spring assembly may exhibit substantial resilience in an axial direction as well as resilience in bending.

Another object of the invention is to provide an improved spring assembly in which the stiffness of the spring in an axial direction may be controlled or adjusted independently of the stiffness of the spring in bending.

These and more specific objects and advantages are obtained in a glass fiber reinforced plastic spring constructed according to the invention.

According to the invention the improved glass fiber reinforced plastic spring assembly is composed of a plurality of spring elements which are assembled to form the complete spring. Each of the elements, between its ends, is formed as a sinuous bar or rod so that it may deflect lengthwise as well as bend sidewise in absorbing and transmitting stress. The group of such rods or bars are assembled in symmetrical relation to each other so that the resulting composite spring has generally equal strength in bending in any direction. The invention further contemplates that the sinuous elements may be either cylindrical rods or they may be spread out into more or less flat plates or flat sheets that are formed to sinuous shapes which when assembled substantially enclose or form a continuous surface for the complete spring.

Preferred forms of the invention are illustrated in the accompanying drawings.

In the drawings:

Figure I is a sectional view of one form of the invention illustrating the general shape of the sinuous glass fiber reinforced plastic elements and their cooperation to form the assembled spring.

Figure II is a side elevation of one of the elements of the composite spring.

Figure III is an end view of the assembled spring.

Figure IV is a cross sectional view of another form of plastic spring constructed according to the invention.

Figure V shows still another form of sinuous rod or bar that is used as an element in the composite spring.

Figure VI shows still another form of sinuous rod or bar suitable for use in the improved glass fiber reinforced plastic spring.

These specific figures and the accompanying description are intended merely to illustrate the invention and not to impose limitations on its scope.

The improved glass fiber reinforced plastic composite spring includes a plurality of sinuous elements 1 having axially aligned end portions 2 that are clamped or otherwise secured in end clamps 3 and 4. The sinuous elements 1 are each constructed of a large plurality of longitudinally extending glass fibers embedded in a hardened resin adhesive. These elements are molded to the shape shown before the resin hardens, so that after the resin hardens the rods maintain their shape and resist any deformation in bending from that shape by stress in the glass fiber filaments embedded in the resin. The end portions 2 of each of the sinuous elements 1 is preferably made sector shaped in cross section, as may be seen in Figure III, so that in total the end portions of the group of elements 1 substantially fills all the cross sectional area within the clamping end members 3 and 4. This prevents any twisting or derangement of the spring elements 1 and insures that regardless of the direction of the bending stress at least two of the elements will be positioned so as to absorb the greater portion of the stress in bending and thus minimize any torsional stress in the other members.

Preferably the center portion of each of the sinuous elements 1 is circular in cross-section and such circular cross-sectional shape is continued around the end curves 5 and 6 and then merges smoothly from the circular to the sector shaped cross section of the end portion 2.

While sector shaped end portions are shown as being a preferred symmetrical form any non-circular shape may be used for the end portions 2 of the elements so long as such shapes will nest together within the clamps 3 and 4.

Preferably the sinuous elements 1 are constructed of longitudinally extending glass fiber filaments embedded in a hard resin adhesive. The adhesive may be selected from any of a number of compounds such as polymerizable unsaturated polyesters, diallylesters, and epoxy resins. The latter, the epoxy resins, show particularly good adhesion to the glass fibers. Suitable resins in the uncured form and especially designed for use with filamentary glass fiber are available from resin manufacturers.

In the preparation of the sinuous elements 1 the glass fiber filaments are thoroughly saturated or wetted with the liquid resin and then are molded and cured under heat with or without pressure, as may be required, to form the particular shapes for the sinuous elements.

While the individual rod-like elements are preferred, the improved glass fiber reinforced plastic spring may also be constructed as a substantially toroidal shaped member as illustrated in Figure IV. In this form the glass fiber reinforced plastic is shaped as a shell 10 having oppositely directed necked-in portions 11 and 12 that are clamped or otherwise secured within terminal clamps 13 and 14. In this embodiment the individual glass fibers extend from neck to neck following the general curvature of the body, that is, the fibers are gathered together densely in the neck portions 11 and 12 and then fan out laterally through regions 15 and 16 and then run parallel to the axis through the central portion 17 of the shell.

Enough fibers must be used in this form so that the radially extending and central portions 15, 16 and 17 have substantial thickness so as to be able to resist stresses in bending.

Another form of sinuous glass fiber reinforced spring element is illustrated in Figure V. In this form each of the sinuous elements 20 is a rod-like member that is formed as a single loop with oppositely directed end portions 21 and 22 and an interconnecting looped central portion. Preferably the central portion of the element 20 is of circular or generally circular cross section while the end portions 21 and 22 are of non-circular cross section arranged to nest within and be securely fastened within end clamps 23 and 24. The looped form of these elements 20 provides a substantial length for bending resilience in a comparatively small volume. It also makes a rather attractive appearing configuration when a plurality of such looped elements 20 are assembled in symmetrical relation.

Still another form of sinuous element for use in the composite spring is illustrated in Figure VI. As shown in this figure each of the sinuous elements 30 is shown with several reverse bends or turns so as to increase its effective length for accommodating in bending axial deflections of its end portions 31 and 32. In this example, like those shown in Figures I and V, the sinuous elements 30 are preferably circular in cross section except for the end portions 31 and 32 which are of a non-circular shape adapted to nest within the end clamps 33 and 34.

While the end clamps in these various embodiments have been illustrated as having a comparatively short axial length it is contemplated that in actual construction the spring elements would have considerably longer end terminal portions for clamping purposes and thus distribute the stress over a greater area of contact between the end clamp and the glass fibers making up the sinuous elements. This is necessary because of the relatively weak strength of the glass fiber reinforced plastic articles in shear as compared to the strength in tension, compression or bending where the stress is applied or exerted parallel to the length of the reinforcing glass elements.

In each of the examples illustrated the composite glass fiber reinforced plastic springs have the desirable characteristic of being able to resiliently absorb, by bending stresses, any stress exerted axially of the spring as well as any bending forces tending to tip one end of the spring relative to the other end. Furthermore, since a substantial amount of glass fiber in resin may be employed for a given stiffness, it is possible because of such increased amount to be able to withstand the torsional stresses that may be exerted between the ends of the spring without resulting in premature failure of the assembly.

The spring elements or sinuous members illustrated in Figures I, V and VI may be manufactured either by an individual molding process or by a continuous process wherein the glass filaments are coated with uncured resin as they are drawn through a resin impregnating tank, the resin is partially cured, the rods are formed to the desired configuration, and then the resin is completely cured. The principal requirement is that adequate bonding or adhesion be obtained between the glass fibers and the adhesive so that the shearing stresses exerted in the bonds between the filaments may be carried without rupture.

Various modifications in the particular shape of the structural elements of the improved spring may be made without departing from the scope of the invention.

Having described the invention, I claim:

1. A glass fiber reinforced resin spring comprising a plurality of sinuous rod-like glass fiber reinforced plastic rods, each of said rods having an end portion that is sector shaped in cross section, said rods being arranged symmetrically with respect to a central axis with the sector shaped end portions forming cylindrical sections, and means securing said end portions in assembled relation for transmission of force to and from the spring.

2. A glass fiber reinforced resin spring comprising a plurality of sinuous glass fiber reinforced plastic elements, said elements being generally symmetrically arranged with respect to a central axis, each of said elements having an end portion that is shaped as a part of a cylinder, and means securing said end portions in a cylindrical bundle.

3. A glass fiber reinforced resin spring comprising a plurality of sinuous rod-like glass fiber reinforced plastic elements, each of the elements having a pair of aligned ends and an offset central portion connected to the ends by generally S-shaped sections, said elements being arranged symmetrically about a central axis with said ends secured together in compact generally cylindrical bundles aligned with the central axis.

4. A glass fiber reinforced plastic spring according to claim 2 in which the aligned ends of the elements have sector shaped cross sections.

References Cited in the file of this patent

UNITED STATES PATENTS

| | | |
|---|---|---|
| 2,009,496 | Johnson | July 30, 1935 |
| 2,185,433 | Fenn et al. | Jan. 2, 1940 |
| 2,689,464 | Wurtz | Sept. 21, 1954 |
| 2,812,936 | Setz | Nov. 12, 1957 |

FOREIGN PATENTS

| | | |
|---|---|---|
| 236,735 | Germany | July 11, 1911 |
| 264,757 | Great Britain | Jan. 27, 1927 |